(12) United States Patent
Jensen et al.

(10) Patent No.: US 11,087,241 B2
(45) Date of Patent: *Aug. 10, 2021

(54) METHODS AND ARRANGEMENTS FOR AN AUTOMATED EXCHANGE SYSTEM

(71) Applicant: NASDAQ TECHNOLOGY AB, Stockholm (SE)

(72) Inventors: Daniel Jensen, Saltsjo-Boo (SE); Bjorn Carlsson, Stockholm (SE); Tobias Hallor, Saltsjo-Boo (SE)

(73) Assignee: Nasdaq Technology AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,595

(22) Filed: May 15, 2019

(65) Prior Publication Data

US 2019/0370698 A1 Dec. 5, 2019

Related U.S. Application Data

(63) Continuation of application No. 13/467,263, filed on May 9, 2012, now Pat. No. 10,325,225.

(51) Int. Cl.
*G06F 15/16* (2006.01)
*G06Q 10/00* (2012.01)
(Continued)

(52) U.S. Cl.
CPC ........... *G06Q 10/00* (2013.01); *G06Q 10/107* (2013.01); *G06Q 40/04* (2013.01)

(58) Field of Classification Search
CPC ....... G06Q 10/00; G06Q 10/107; G06Q 40/04
See application file for complete search history.

(56) References Cited

U.S. PATENT DOCUMENTS

| 6,256,667 | B1 | 7/2001 | Wahlander et al. |
| 7,574,400 | B1 | 8/2009 | Stokum et al. |

(Continued)

FOREIGN PATENT DOCUMENTS

| WO | WO 01/84450 | 11/2001 |
| WO | WO 02/056147 | 7/2002 |

OTHER PUBLICATIONS

NPL, "OMnet API Conformance Document", Apr. 2010, hereinafter Nasdaq1 (Year: 2010).*

(Continued)

*Primary Examiner* — Padma Mundur
(74) *Attorney, Agent, or Firm* — Nixon & Vanderhye, P.C.

(57) ABSTRACT

A method of processing exchange system trading data is disclosed. In one embodiment, the method comprises receiving an order data message from a matching engine of an automated exchange. The order data message has first data format and it also comprises identification information associated with a trading entity. The received data message is then converted into a new data message of a new data format, which is different from the data format of the received order data message. Also, the trading entity from which the received order data message is originating is identified. Subsequently, the new data message having the new data format can be transmitted to a plurality of client devices associated with the identified trading entity. This may allow for all, or at least a majority of client devices, of the identified trading entity to get an overview of the total order activity of the identified trading entity.

20 Claims, 12 Drawing Sheets

(51) Int. Cl.
*G06Q 40/04* (2012.01)
*G06Q 10/10* (2012.01)

(56) References Cited

U.S. PATENT DOCUMENTS

| | | | | |
|---|---|---|---|---|
| 2002/0023045 | A1* | 2/2002 | Feilbogen | G06Q 40/00 |
| | | | | 705/37 |
| 2002/0128946 | A1 | 9/2002 | Chehade et al. | |
| 2004/0266411 | A1* | 12/2004 | Galicia | H04M 3/5307 |
| | | | | 455/414.4 |
| 2005/0144137 | A1 | 6/2005 | Kumar et al. | |
| 2005/0267836 | A1* | 12/2005 | Crosthwaite | G06Q 40/06 |
| | | | | 705/37 |
| 2006/0106941 | A1* | 5/2006 | Singhal | H04L 67/2823 |
| | | | | 709/238 |
| 2010/0198716 | A1 | 8/2010 | Chatzky et al. | |
| 2011/0153521 | A1* | 6/2011 | Green | G06Q 40/06 |
| | | | | 705/36 R |

OTHER PUBLICATIONS

NPL, "NASDAQ OMX Update", Jun. 2010, hereinafter Nasdaq2 (Year: 2010).*
Written Opinion of the International Searching Authority dated Jan. 20, 2014 in International Application No. PCT/SE2013/050503.
International Search Report dated Jan. 20, 2014 in International Application No. PCT/SE2013/050503.
NPL, Web document, "OMnet API Conformance Document," Apr. 2010.
NPL, Web document, "NASDAQ OMX Update," Jun. 2010.

* cited by examiner

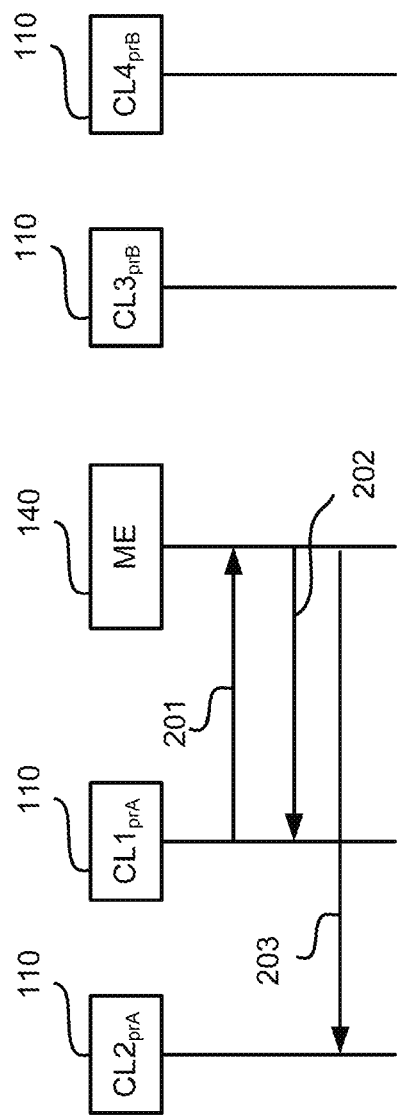
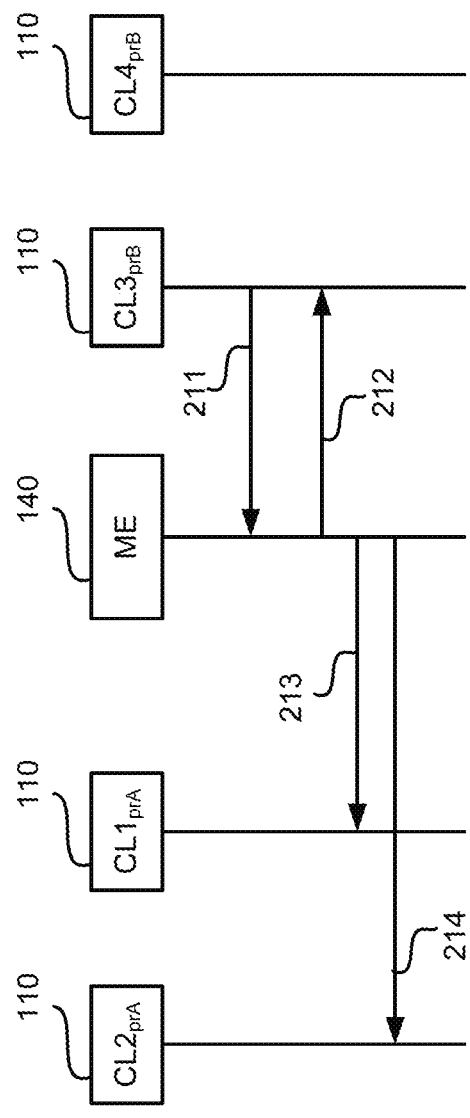

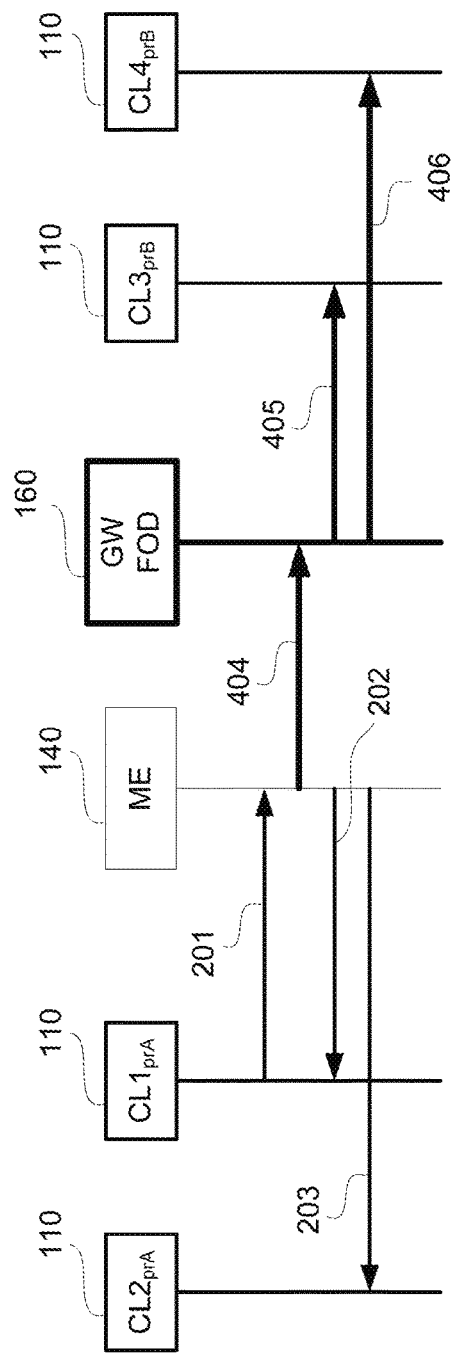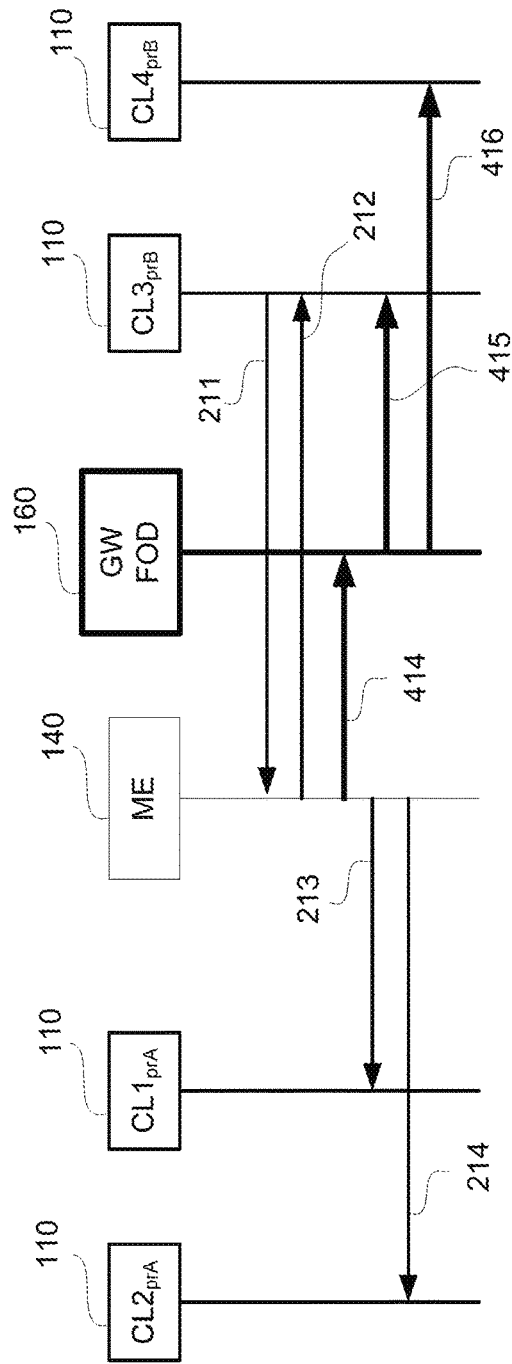
FIG. 4A
FIG. 4B

METHODS AND ARRANGEMENTS FOR AN AUTOMATED EXCHANGE SYSTEM

CROSS-REFERENCED TO RELATED APPLICATIONS

This application is a continuation of U.S. patent application Ser. No. 13/467,263 filed May 9, 2012 which is hereby incorporated by reference in its entirety.

TECHNICAL FIELD

Embodiments of the present invention presented herein generally relate to an automated exchange system. In particular, embodiments of the present invention present methods and arrangements, e.g. gateways, for an automated exchange system.

BACKGROUND

When a seller and a buyer, i.e. order or quote owners, agree to a particular price for a financial instrument they complete a trade. That is to say that they complete a verbal, or electronic, transaction involving one party buying a financial instrument from another party. The trades are typically initiated and completed by trading entities such as individuals, firms, dealers (who may be either individuals or firms), traders and brokers or sometimes by the order owners themselves. Trading of financial instruments is generally performed on an exchange, i.e. a trading venue and the trading is typically done through brokers, or traders, who buy or sell the financial instruments on behalf of the order owners. The term "financial instruments" is used in a broad sense and encompasses any tradable item i.e. securities, derivative or commodity, such as stocks, bonds, cash, swaps, futures, foreign exchange, options, gas electricity and so forth, or group of items that is traded through matching of counterparty orders.

A conventional automated exchange typically receives order input data, in the form of data messages, from external devices used by traders, or brokers. The traders, or brokers, submit orders and/or quotes (or alterations/cancellations thereof) to the automated exchange for purposes of trading. In this context, an order is a request to sell or buy a financial instrument from any trading participant of the automated exchange and a "quote" may be an "offer" price, a "bid" price, or a combination of both an "offer" and "bid" price of a financial instrument, and is determined from quotations made by market makers (or dealers).

The orders/quotes may relate to buying and/or selling of any type of financial instrument. In particular, the input data to the automated exchange can be an order data message that represents the placing of a new bid or sell order, or a new quote. The order data message can also represent the change of an existing bid or sell order, or a quote. In addition, the order data message can represent a cancellation/change of an existing bid or sell order, or a quote.

FIG. 1 illustrates an example of a conventional automated exchange system 100. It comprises trader terminals in the form of client devices 110 that are used for e.g. issuing order data messages, i.e. input data received by the automated exchange 140. The client devices 110 are connectable, for example over the internet 120A, or over some other connection means like a dedicated fiber 120B, to an electronic marketplace, i.e. the automated exchange 140. The automated exchange 140 can be hosted on a single computer server or a cluster of computer servers. Typically, the automated exchange 140 comprises a matching engine, herein sometimes also abbreviated ME. Sometimes the client devices 110 are connected to the automated exchange 140 through a gateway 130. The gateway 130 is connected to, or being a part of, the automated exchange 140 and is configured to receive market actions, i.e. orders and/or quotes from the client devices 110. A gateway 130 is usually in connection with the automated exchange 140 on a dedicated network and forwards the market actions to the automated exchange 140 and further usually broadcast updates back to the client devices 110. It should however be understood that information being communicated to and from the automated exchange 140 and the client devices 110 could be communicated via a single communication path. While the client devices 110 in FIG. 1 are illustrated as client devices that traditionally are associated with manual input of market actions, the client devices 110 can also be implemented as algorithmic trading units, sometimes termed automatic order generators, having manual input means for control of the algorithmic trading unit. The algorithmic trading unit may be pre-programmed with instructions to automatically generate sell and buy orders and quotes (or changes/cancellations thereof) in response to input data received from the automated exchange 140. The client devices 110 also represent market makers inputting quotes to the automated exchange 140.

FIG. 2A is a signalling diagram illustrating an example of a present signalling in an automated exchange system 100 when the matching engine of the automated exchange system 140 receives an inbound order data message. In the example shown in FIG. 2A, there are four different client devices 110, denoted CL1, CL2, CL3 and CL4. All four client devices are associated with the same trading entity, e.g. the same trading firm. Some of the client devices 110 are configured to operate according to a first protocol, prA, and other client devices 110 are configured to operate according to a second protocol, prB. In this example, the first protocol, prA, is the so-called OMNet protocol and the second protocol, prB, is the so-called OUCH protocol.

In FIG. 2A, the matching engine 140 receives 201 an inbound order data message from a client 110, CL1, which is operating according to the OMNet protocol. An outbound message is subsequently transmitted 202, 203, or broadcasted, to the client devices 110 that are operating according to the OMNet protocol, i.e. CL1 and CL2. However, as can be seen in the figure, the client devices 110 that are operating according to the OUCH protocol do not receive the outbound message.

FIG. 2B is a signalling diagram illustrating another example of signalling in an automated exchange system 100 when the matching engine 140 receives 211 an inbound order data message. In this example, the matching engine 140 receives 211 an inbound order data message from a client 110, CL3, which is operating according to the OUCH protocol. An outbound message resulting from the matching engine 140 is subsequently returned 212 to the client device from which the matching engine 140 received the inbound order data message. Also, the matching engine 140 transmits 213, 214, or broadcasts, the outbound message to the client devices 110 that are operating according to the OMNet protocol, i.e. CL1 and CL2. However, as can be seen in the figure, the other client devices 110, CL4, that is operating according to the OUCH protocol does not receive the outbound message.

In both examples, the outbound messages resulting from matching 140 will not be transmitted to all client devices 110 of the same trading entity, e.g. the same trading firm.

Instead, only some of the total number of client devices 110 of the same trading entity can receive the outbound message. Whether a certain client device 110 receives the outbound message or not is dependent on which protocol the client device 110 in question supports.

FIG. 3 is a signalling diagram illustrating an example of the current signalling in an automated exchange system 100 after a matching event has occurred, e.g. a trade has been settled. A post-trade data message is sent 301 from the matching engine 140 to a post-trade gateway 150. The post-trade gateway 150 is responsible for various post-trade activities. Sometimes the post-trade gateway 150 is referred to as a clearance gateway or a settlement gateway. In the example illustrated in FIG. 3, the post-trade gateway 150 is operating according to prA, i.e. the so-called OMNet protocol. In this example, the post-trade gateway 150 (see also FIG. 1) receives 301 the post-trade data message and will, subsequently, transmit 302, 303, or broadcast an outbound post-trade message to those client devices of the trading entity that are operating in accordance with the OMNet protocol, i.e. client devices CL1 and CL2. However, other client devices 110, e.g. those client devices operating according to a different protocol such as the OUCH protocol, may not receive the outbound message from the post-trade gateway 150.

The outbound post-trade data message will thus not be transmitted to all client devices 110 of the same trading entity, e.g. a trading firm. Instead, only some of the total number of client devices 110 of the same trading entity can receive the outbound post-trade data message. Whether a certain client device 110 receives the outbound message or not is dependent on which protocol the client device 110 supports.

SUMMARY

It is in view of these considerations and others that the various embodiments of the present invention have been made. It is a general object of the various embodiments of the present invention to provide for methods and arrangements by which one or more of the above-mentioned disadvantages can be mitigated, alleviated or eliminated.

This object is addressed by the present invention as set out in the appended independent claims. Advantageous embodiments are recited in the appended dependent claims.

According to a first aspect, there is provided a method of processing exchange system trading data. The method comprises receiving, by a receiver, a first data message from a matching engine, the first data message having a first data format and comprising identification information associated with a trading entity; converting, by a processing circuitry, the first data message of the first data format into a second data message having a second data format different from the first data format; identifying, on the basis of the identification information of the received first data message, the trading entity from which the first data message is originating; and transmitting, by a transmitter, the second data message to one or more client devices associated with the identified trading entity.

The converting may comprise fetching pre-selected information elements from the first data message and creating the second data message based on the fetched information elements. For example, the fetching may comprise fetching at least the first two information elements of the first data message. In one embodiment, the fetching comprises fetching the first five information elements of the first data message. Alternatively, the fetching may comprise fetching information from any of the first five information elements of the first data message.

In some embodiments, the converting further comprises converting, by the processing circuitry, the first data message of the first data format into an additional, third, data message having a third data format different from the first data format. The converting may comprise fetching pre-selected information elements from the first data message and creating the second data message based on the fetched information elements; and fetching pre-selected information elements from the first data message and creating the third data message based on the fetched information elements. For example, the fetching may comprise fetching information from the first five information elements of the first data message.

The method may additionally comprise receiving, by the receiver, an additional, fourth, data message from the matching engine, the fourth data message having a fourth data format and comprising identification information associated with a trading entity; converting, by the processing circuitry, the fourth data message of the fourth data format into a fifth data message having a fifth data format different from the fourth data format; identifying, on the basis of the identification information of the received fourth data message, the trading entity from which the fourth data message is originating; and transmitting, by a transmitter, the fifth data message to one or more client devices associated with the identified trading entity. The converting of the fourth message may comprise fetching pre-selected information elements from the first data message and the fourth data message and creating the fifth data message based on the fetched information elements from the first data message and the fourth data message, respectively. Moreover, the fetching may comprise fetching information from at least one of the information elements of the first data message and fetching information from at least three information elements of the fourth data message.

In some embodiments, the converting comprises discarding those information elements of the first data message that are data format specific to the first data format.

Furthermore, the method may advantageously be performed by a gateway.

According to a second aspect, there is provided a method for an automated exchange system. The method comprises receiving a first data message from a post-trade gateway, the first data message having a first data format and comprising identification information associated with a trading entity; converting, by a processing circuitry, the first data message of the first data format into a second data message having a second data format different from the first data format; identifying, on the basis of the identification information of the received first data message, the trading entity from which the first data message is originating; and transmitting, by a transmitter, the second data message to one or more client devices associated with the identified trading entity.

The converting may comprise fetching pre-selected information elements from the first data message and creating the second data message based on the fetched information elements. For example, the fetching may comprise fetching at least the first five information elements of the first data message. The first data format may be BD6. Also, the method according to the second aspect may advantageously be performed by a gateway.

According to a third aspect, there is provided a gateway for processing exchange system trading data. The gateway comprises a receiver configured to receive a first data message from a matching engine, the first data message having a first data format and comprising identification information associated with a trading entity; a processing circuitry configured to convert the first data message of the first data format into a second data message having a second data format different from the first data format, and to identify, on the basis of the identification information of the received first data message, the trading entity from which the first data message is originating; and a transmitter configured to transmit the second data message to one or more client devices associated with the identified trading entity.

The processing circuitry may be configured to fetch pre-selected information elements from the first data message and create the second data message based on the fetched information elements. For example, the processing circuitry may be configured to fetch at least the first two information elements of the first data message. In one embodiment, the processing circuitry may be configured to fetch the first five information elements of the first data message. The processing circuitry may also be configured to fetch information from any of the first five information elements of the first data message.

In some embodiments, the processing circuitry is further configured to convert the first data message of the first data format into an additional, third, data message having a third data format different from the first data format. The processing circuitry may be configured to fetch pre-selected information elements from the first data message and create the second data message based on the fetched information elements; and to fetch pre-selected information elements from the first data message and create the third data message based on the fetched information elements. For instance, the processing circuitry may be configured to fetch information from the first five information elements of the first data message.

In some embodiments, the receiver is configured to receive, an additional, fourth, data message from the matching engine, the fourth data message having a fourth data format and comprising identification information associated with a trading entity; the processing circuitry is configured to convert the fourth data message of the fourth data format into a fifth data message having a fifth data format different from the fourth data format; and to identify, on the basis of the identification information of the received fourth data message, the trading entity from which the fourth data message is originating; and the transmitter is configured to transmit, the fifth data message to one or more client devices associated with the identified trading entity. The processing circuitry may be configured to fetch pre-selected information elements from the first data message and the fourth data message and creating the fifth data message based on the fetched information elements from the first data message and the fourth data message, respectively. In on embodiment, the processing circuitry is configured to fetch information from at least one of the information elements of the first data message and fetch information from at least three information elements of the fourth data message.

In some embodiments, the processing circuitry is configured to discard those information elements of the first data message that that are data format specific to the first data format.

According to a fourth aspect, there is provided a gateway for processing exchange system trading data. The gateway comprises a receiver configured to receive a first data message from a post-trade gateway, the first data message having a first data format and comprising identification information associated with a trading entity; a processing circuitry configured to convert the first data message of the first data format into a second data message having a second data format different from the first data format, and to identify, on the basis of the identification information of the received first data message, the trading entity from which the first data message is originating; and a transmitter configured to transmit the second data message to one or more client devices associated with the identified trading entity.

The processing circuitry may be configured to fetch pre-selected information elements from the first data message and create the second data message based on the fetched information elements. In one embodiment, the processing circuitry may be configured to fetch at least the first five information elements of the first data message. The first data format may be BD6.

Various embodiments of the present invention may allow for all, or at least a majority of client devices belonging to one specific trading entity (e.g. a trading firm), to get an overview of total order activity or total trade activity of this particular trading entity. Thus, all, or at least a majority of, traders of one and the same trading entity may be provided with an aggregated view of the total order or total trade activity of this specific trading entity.

BRIEF DESCRIPTION OF THE DRAWINGS

These and other aspects, features and advantages of the invention will be apparent and elucidated from the following description of embodiments of the present invention, reference being made to the accompanying drawings, in which:

FIGS. 2A-2B are signalling diagrams illustrating two examples of signalling in an automated exchange system 100;

FIGS. 4A-4B show signalling diagrams illustrating two examples of signalling in an automated exchange system 100 according to embodiments of the invention;

DETAILED DESCRIPTION

Figure 1:
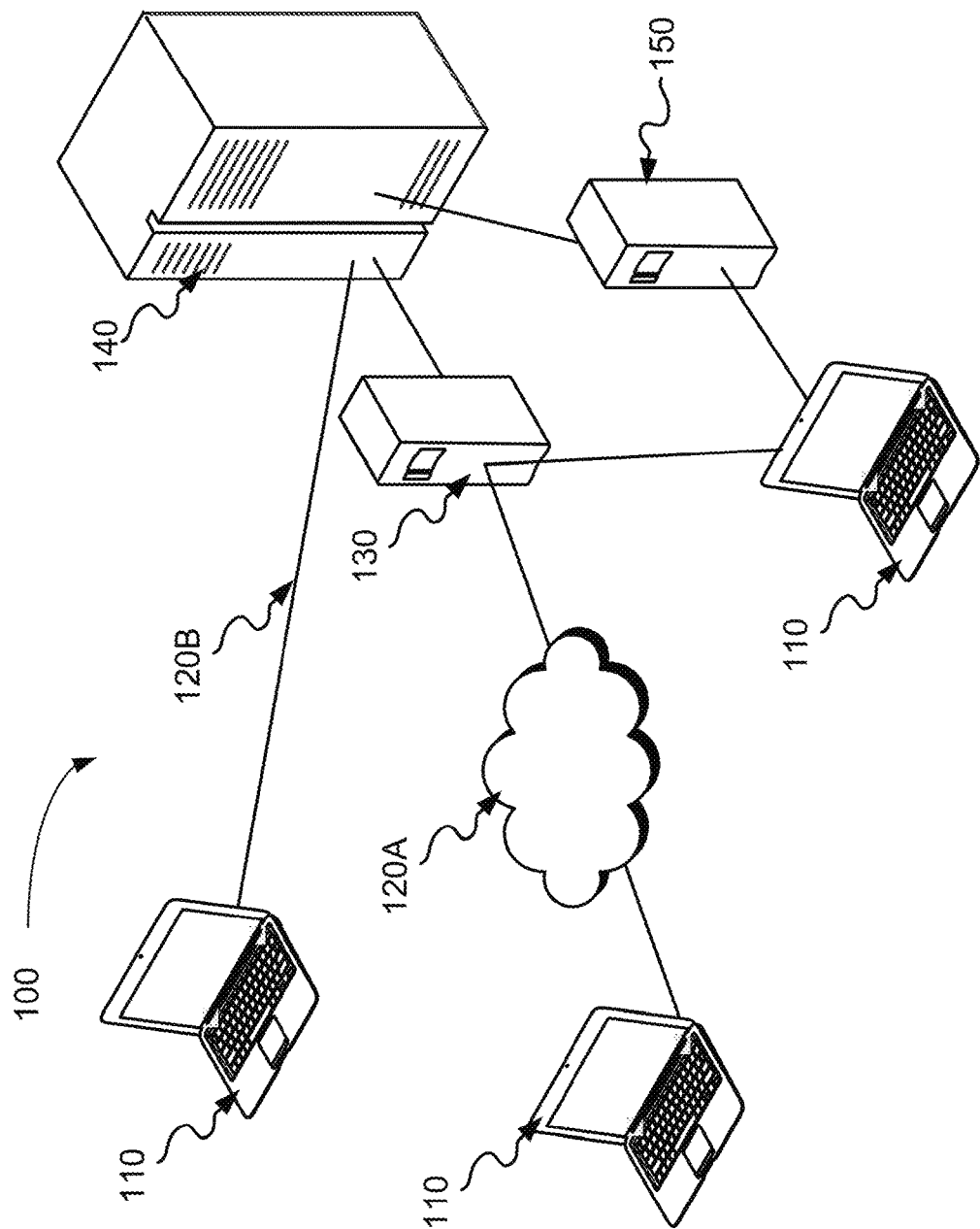
FIG. 1 illustrates an automated exchange for automated electronic trading of financial instruments.

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like numbers refer to like elements throughout the description.

With reference to FIG. 4A, a first embodiment of the invention will be discussed. FIG. 4A differs from the signaling diagram in FIG. 2A in that a novel gateway 160 is introduced. Also, the signaling in FIG. 4A differs from the signaling FIG. 2A as will be further detailed herein below. This novel gateway 160 can be referred to as a "Firm Order Drop" gateway.

Similar to the signaling in FIG. 2A, the matching engine 140 receives 201 an inbound order data message from a client 110, CL1, which is operating according to a first protocol, i.e. the OMNet protocol in this example. An outbound message is subsequently transmitted 202, 203, or broadcasted, to the client devices 110 that are operating according to the OMNet protocol, i.e. CL1 and CL2. Furthermore, the gateway 160 receives 404 the order data message from the matching engine 140. This order data message has a certain data format, which is in conformity with the OMNet protocol. The gateway converts the received order data message having the certain data format into a second order data message having a different data format. Details regarding the conversion from one data format to another will be further discussed herein with reference to FIG. 6. Furthermore, the gateway 160 identifies, on the basis of identification information of the received order data message, the trading entity from which the order data message is originating. Subsequently, the order data message having the new, different, format can be transmitted 405, 406, or broadcasted, to one or more (e.g. all), client devices associated with the identified trading entity, e.g. a trading firm. As is illustrated in FIG. 4A, all client devices of the same trading entity, e.g. the same trading firm, may receive outbound order data messages. This way, all client devices of the same trading entity can get an overview of total order activity of this trading entity. The introduction of the novel gateway 160 and the new signaling may thus allow for the ability for all client devices of a specific trading entity to get an aggregated view of the total order activity of a specific trading entity.

With reference to FIG. 4B, a second embodiment of the invention will be described. FIG. 4B differs from the signaling diagram in FIG. 2B by the introduction of the gateway 160. As can be seen, also the signaling in FIG. 4B differs from the signaling of FIG. 2B. The matching engine 140 receives 211 an inbound order data message from a client 110, CL3, which is operating according to a second protocol, i.e. the OUCH protocol in this example. An outbound message is subsequently returned 212, i.e. transmitted, to the client device 110, CL3, from which the inbound order data message was received. Additionally, outbound order data messages are transmitted 213, 214, or broadcasted, to those client devices 110, CL1 and CL2, that are operating in accordance with the other protocol, prA, i.e. OMNet in this example. Moreover, the gateway 160 receives 414 the order data message from the matching engine 140. The gateway 160 converts the received order data message having the certain data format into a second order data message having a different data format. Details regarding the conversion from one data format to another will be further disclosed herein with reference to FIG. 6. Furthermore, the gateway 160 identifies, on the basis of the identification information of the received order data message, the trading entity from which the inbound order data message is originating. Subsequently, the order data message having the new, different, format can be transmitted 415, 416, or broadcasted, to one or more, e.g. all, client devices associated with the identified trading entity, e.g. a trading firm. As is illustrated in FIG. 4B, all client devices of the same trading entity, e.g. the same trading firm, can receive outbound order data messages. This way, all client devices of the same trading entity can get an overview of the total order activity of this trading entity. Or said differently, the introduction of the novel gateway 160 and the new signaling may allow for the ability for all client devices 110 of a specific trading entity to get an aggregated view of the total order activity of the specific trading entity.

Figure 3:
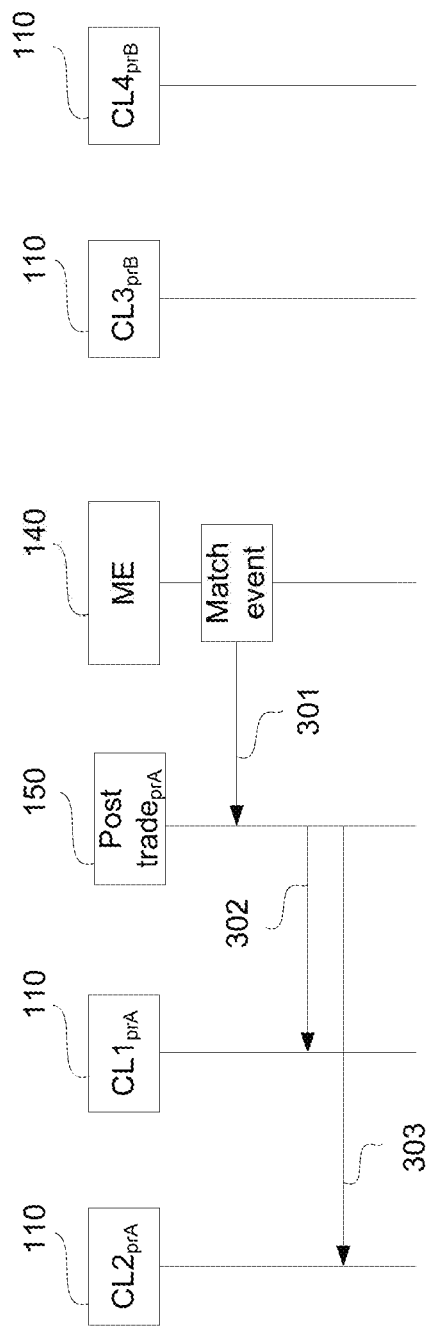
FIG. 3 is a signalling diagram illustrating an example signalling in an automated exchange system 100 after a matching event has occurred.
Figure 5:
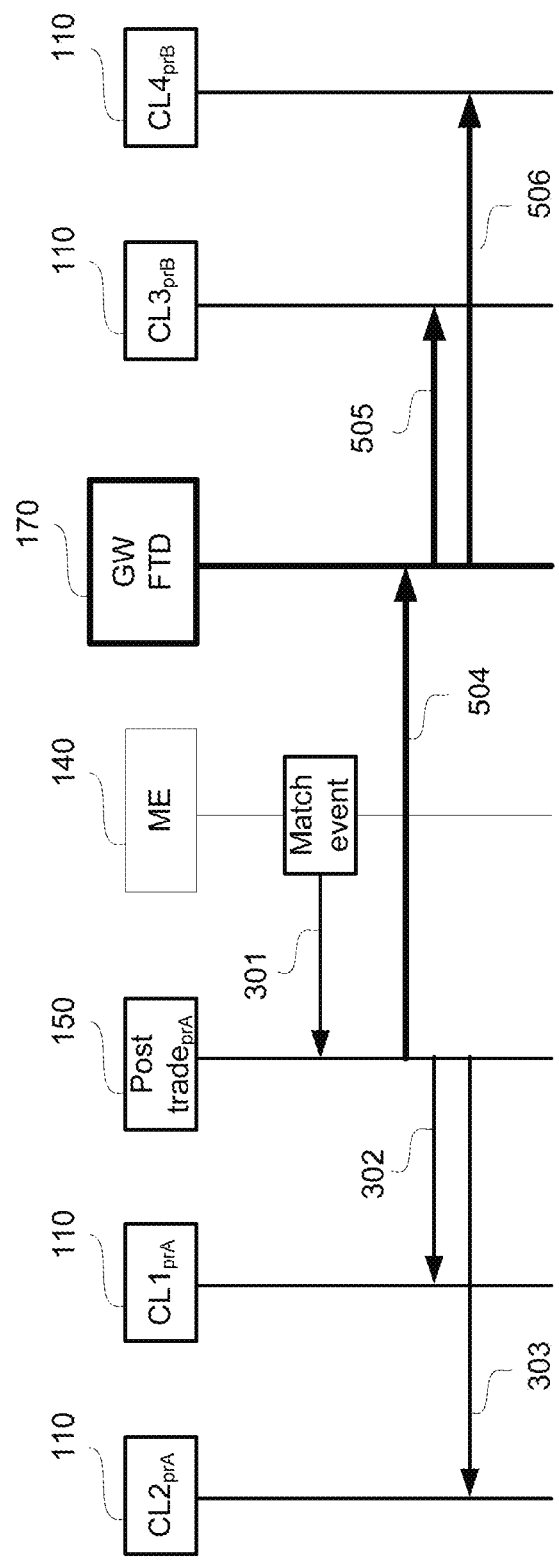
FIG. 5 is a signalling diagram illustrating an example signalling in an automated exchange system 100 after a matching event has occurred according to an embodiment of the invention.

FIG. 5 illustrates yet another embodiment of the invention. As can be seen, this figure differs from FIG. 3 in that a novel gateway 170 is introduced. The signaling in FIG. 5 differs from the signaling in FIG. 3 as will be further detailed herein below. This novel gateway 170 can be referred to as a "Firm Trade Drop" gateway. In FIG. 5, a post-trade data message is sent 301 from the matching engine 140 to a post-trade gateway 150. The post-trade gateway 150 is responsible for various post-trade activities. In this example embodiment, the post-trade gateway 150 is operating according to prA, i.e. the so-called OMNet protocol. As can be seen in the figure, the post-trade gateway 150 receives 301 the post-trade data message. Subsequently, the post-trade gateway 150 transmits 302, 303, or broadcasts, an outbound post-trade message to those client devices of the trading entity that are operating in accordance with the same protocol as the post-trade gateway 150. i.e. client devices CL1 and CL2. Additionally, the gateway 170 receives the post-trade data message 504 from the post-trade gateway 150. The gateway 170 converts the received post-trade data message having the certain data format into a second post-trade data message having a different data format. Details regarding the conversion from one data format to another will be further disclosed herein with reference to FIG. 7. Furthermore, the gateway 170 identifies, on the basis of the identification information of the received order data message, the trading entity from which the inbound order data message is originating. Subsequently, the order data message having the new, different, format can be transmitted 505, 506, or broadcasted, to one or more, e.g. all, client devices associated with the identified trading entity, e.g. a trading firm. This way, all client devices of the same trading entity can get an overview of the total trade activity of this trading entity. Or more specifically, any client device 110 of the same trade entity can get an overview of all settled trades relating to the trading entity to which the client device belongs. Hence, the introduction of the novel gateway 170 and the new signaling may allow for the ability for all client devices 110 of a specific trading entity to get an aggregated view of settled trades relating to the specific trading entity.

With reference to FIG. 6, various examples of conversions from a first data message of a first data format into a second data message having a second data format, which is different from the first data format, will be described. As can be seen in the figures, there exist various information elements according to the following:

TABLE 1

Information elements and content of the information elements.

| Information Element Name | Information Content |
|---|---|
| Order book ID | The name of the traded instrument that is affected by the order change; ex ERIC B |
| Order ID | The ID of a particular order |
| Owner | The owner of the order. Comprises ID or identification information of the trading entity. |
| Update type | The update can be of any of the following types: Add, Delete, Modify. "Add" relates to new orders, "Delete" relates to existing orders that are deleted and "Modify" relate to existing orders that are modified. |
| Basic order info. | Price, Quantity, Order type, etcetera. |
| Extended order info. | Add-on information regarding a certain order. This information element is not available for all protocols. For example, the OUCH protocol which is supporting low-latency trade include less information elements and, hence, the data format in accordance with OUCH does not include this information element. On the other hand, the OMNet protocol allows more information elements in its data formats. Thus, the data format in accordance with OMNet includes extended order information. This information may include additional information on how a certain order should be handled. |

Figure 6A:
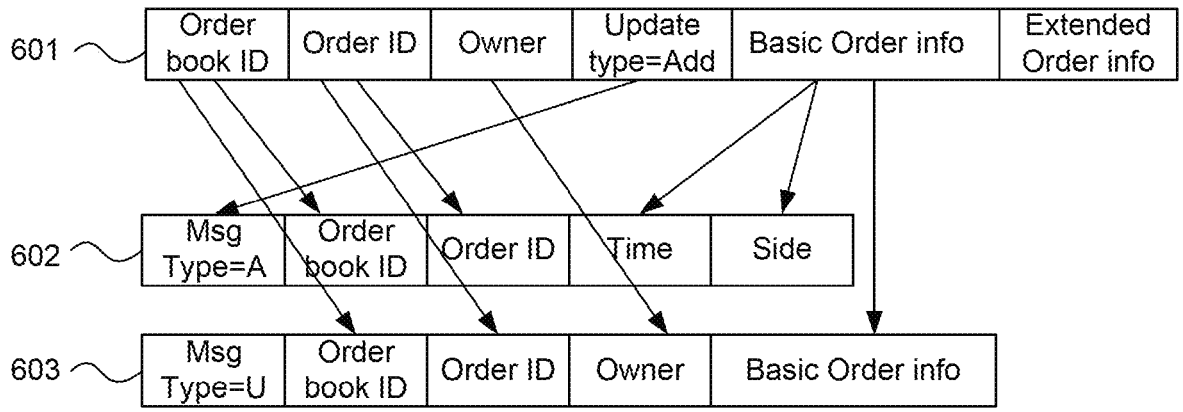
FIGS. 6A-6D illustrates various examples of conversion of data messages according to embodiments of the invention.

FIG. 6A relates to an example when a new order is made. A first order data message 601, which is sometimes referred to as an OrderDetailMessage, is sent from the matching engine 140 to the gateway 160 (see FIG. 4). In this example, the first order data message 601 comprises at least five information elements. Each of the information elements may be of one, two or more bytes. In this example, there are six information elements: Order book ID, Order ID, Owner, Update type=Add, Basic Order info., and Extended Order Info. The first order data message is then converted into a second order data message 602 (e.g., an order accepted message) and a third order data message 603 (e.g., order updated message), i.e. two new order data messages. The second order data message 602 may be created by fetching pre-selected information elements from the first order data message 601, such as the first two information elements. That is, Order book ID and Order ID. Also, information from any of the first five information elements of the first order data message 601 can be fetched and included into the second order data message 602. For example, information about the Time and Side can be fetched from the information element Basic Order Info. into two new information elements, i.e. Side and Time, as is illustrated in FIG. 6A. In this context, side refers to either bid or ask side. The third order data message 603 may be created by fetching information elements or information from information elements of the first order data message 601. For example, the third order data message 603 may be created by fetching the first three information elements (e.g. Order Book ID, Order ID, Owner) of the first order data message 601 and, additionally, the fifth information element (e.g. Basic Order information). As can be seen in FIG. 6A, the information element "Extended Information Element" is discarded and, thus, information from this information element is not used in any of the second and third order data messages 602, 603. Discarding this information element, which is typically protocol specific (as described in Table 1), may be advantageous as it allows for the creation or generation of two new order data messages 602, 603 that do not necessarily have to support the protocol used by the first data format of the first data message 601 including this, protocol-specific, information element. Furthermore, after the gateway 140 has identified the trading entity from which the first data message is originating on the basis of identification information (e.g. the information element "Owner") of the received first order data message 601, the gateway can transmit the new data messages 602 and 603 to one or more client devices associated with the identified trading entity in accordance with the discussion hereinabove with reference to FIG. 4. In some embodiments, the new data messages 602, 603 are transmitted to all client devices 110 of the same trading entity. In other embodiments, the new data messages 602, 603 are only transmitted to those client devices 110 of the trading entity that haven't already received an outbound data message from the matching engine 140. This is controlled by user authorization processes, which give access to various functionalities such as to which devices certain messages should be sent or not and what messages should be broadcasted etc.

Figure 6B:
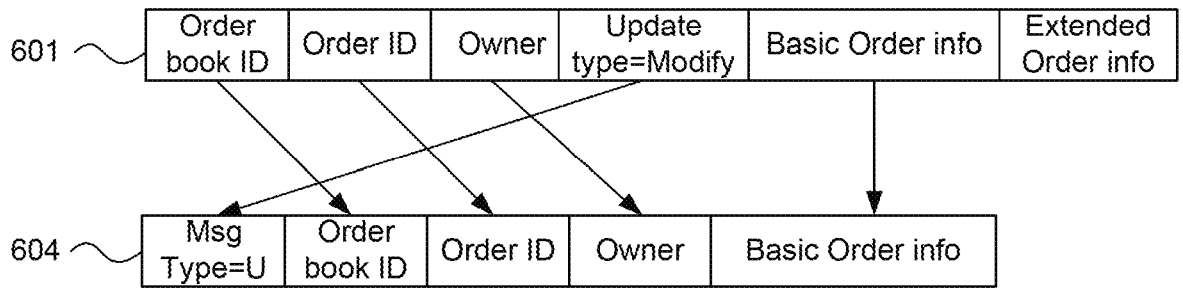

FIG. 6B relates to an example when an existing order is modified. A first order data message 601, e.g. an OrderDetailMessage, is sent from the matching engine 140 to the gateway 160 (see FIG. 4). The first order data message 601 is converted into a new, order data message, e.g. an order updated message 604. The creation of the new order data message 604 is similar to the creation of the third data message 603 as described hereinabove with reference to FIG. 6A. Here, the new order data message 604 may be created by fetching the first five information elements or information from the first five information elements of the first order data message 601, e.g. Order Book ID, Order ID, Owner, Update type=Modify, Basic Order Info. As can be seen in FIG. 6B, the information element "Extended Information Element" is discarded and, thus, information from this information element is not used in the new order data message 604. After the gateway 140 has identified the trading entity from which the first data message is originating on the basis of identification information (e.g. the information element "Owner") of the received first order data message 601, the gateway can transmit the new data message 604 to one or more client devices associated with the identified trading entity in accordance with the discussion hereinabove with reference to FIG. 4. In some embodiments, the new data message 604 is transmitted to all client devices 110 of the same trading entity. In other embodiments, the new data message 604 is only transmitted to those client devices 110 of the trading entity that haven't already received an outbound data message from the matching engine 140.

Figure 6C:
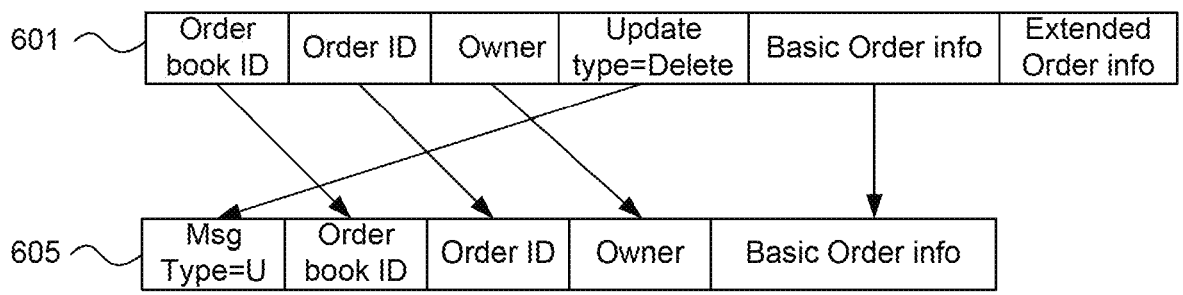

FIG. 6C relates to an example when an existing order is deleted. A first order data message 601, e.g. an OrderDetailMessage, is sent from the matching engine 140 to the gateway 160 (see FIG. 4). The first order data message 601 is converted into a new, order data message, e.g. an order updated message 605. The creation of the new order data message 605 is similar to the creation of the new order data message 604 as described hereinabove with reference to FIG. 6B. Here, the new order data message 605 may be created by fetching the first five information elements or information from the first five information elements of the first order data message 601, e.g. Order Book ID, Order ID, Owner, Update type=Delete, Basic Order Info. Moreover, the sixth information element "Extended Information Element" is discarded and, thus, information from this information element is not used in the new order data message 605. After the gateway 140 has identified the trading entity from which the first data message is originating on the basis of identification information (e.g. the information element "Owner") of the received first order data message 601, the gateway can transmit the new data message 604 to one or more client devices associated with the identified trading entity in accordance with the discussion hereinabove with reference to FIG. 4. In some embodiments, the new data message 605 is transmitted to all client devices 110 of the same trading entity. In other embodiments, the new data message 605 is only transmitted to those client devices 110 of the trading entity that haven't already received an outbound data message from the matching engine 140.

Figure 6D:
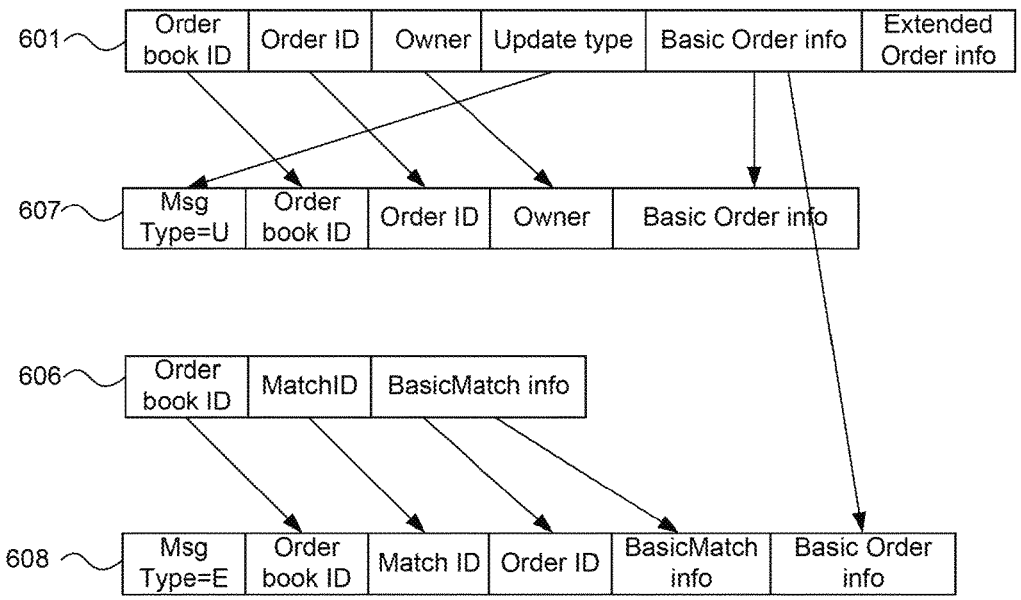

FIG. 6D relates to an example when a order is executed. Two order data messages, e.g. an OrderDetailMessage 601 and a MatchDetailMessage 606, are sent from the matching engine 140 to the gateway 160 (see FIG. 4). In this example, the two received order data messages 601 and 606, respectively, are converted into two new order data messages 607, 608. For example, the OrderDetailMessage 601 is converted into an order updated message 607. Additionally, the MatchDetailMessage 606 is converted into an order executed message 608. The new order data message 607 may be created by fetching the five first information elements from the first order data message 601, e.g. Order Book ID, Order ID, Owner, Update type, Basic order info. The new order data message 608 may be created by fetching information elements from a combination of the first order data message 601 and the additional order data message 606. For example, this new order data message 606 may be created by fetching information from the all or some of the information elements of the additional order data message 606 (e.g. Order Book ID, Match ID, BasicMatchInfo.) and by fetching information from one ore more of the information elements of the first order data message 601 (e.g. Basic Order Info.). As can be seen in FIG. 6D, the information element "Extended Information Element" is discarded and, thus, information from this information element is not used in any of the new order data messages 607, 608. After the gateway 140 has identified the trading entity from which the first data message is originating on the basis of identification information (e.g. the information element "Owner") of the received data messages 601 and 606, respectively, the gateway can transmit the new data messages 607 and 608 to one or more client devices associated with the identified trading entity in accordance with the discussion hereinabove with reference to FIG. 4. In some embodiments, the new data messages 607, 608 are transmitted to all client devices 110 of the same trading entity. In other embodiments, the new data messages 607, 608 are only transmitted to those client devices 110 of the trading entity that haven't already received an outbound data message from the matching engine 140.

Figure 7:
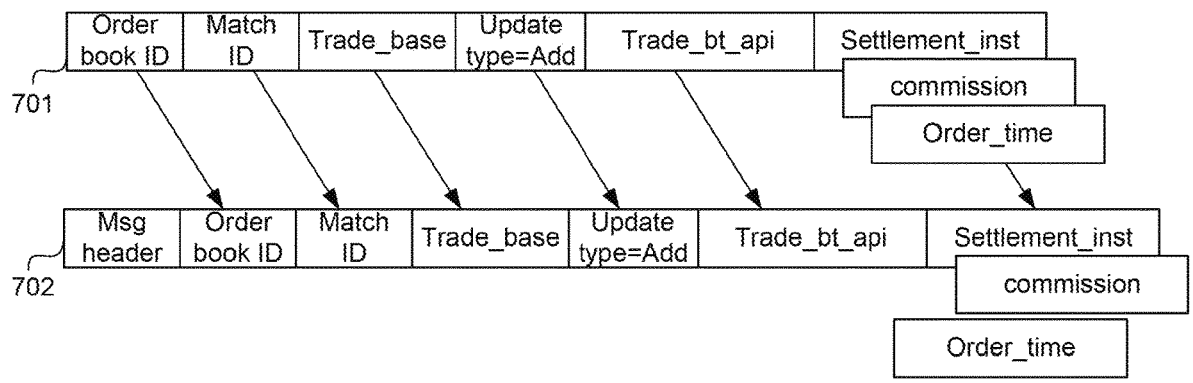
FIG. 7 illustrates an example of a data message conversion according to an embodiment of the invention.

With reference to FIG. 7, an example of a conversion from a first data message of a first data format into a second data message having a second data format, which is different from the first data format, will be described. As can be seen in the figures, there exist various information elements according to the following:

TABLE 2

Information elements and content of the information elements.

Information Element Name

Order Book ID
Match ID
Trade_base
Update type
Trade_bt_api

TABLE 2-continued

Information elements and content of the information elements.

Information Element Name

Settlement_inst
Commission
Order_time

FIG. 7 relates to an example when a trade has been made, or settled. A first trade data message 701, which is sometimes referred to as a BD6 message, is sent from the post-trade gateway 150 to the gateway 170 (see FIG. 5). The first trade data message may, e.g., comprise five or more information elements as illustrated in FIG. 7 and each of the information elements may be of one, two or more bytes. The first trade data message 701 is then converted into a new trade data message 702. The second trade data message 702 may e.g. be created by fetching information from all of the information elements of the first trade message 701, e.g. Order Book ID, Match ID, Trade_base, Update type, Trade_bt_api, Settlement_inst, commission, Order_time. After the gateway 170 has identified the trading entity from which the first trade data message 701 is originating on the basis of identification information (e.g. the information element (Trade_base) of the received first trade data message 701, the gateway can transmit the new data messages 702 to one or more client devices associated with the identified trading entity in accordance with the discussion hereinabove with reference to FIG. 5. In some embodiments, the new data message 702 is transmitted to all client devices 110 of the same trading entity. In other embodiments, the new data message 702 is only transmitted to those client devices 110 of the trading entity that haven't already received an outbound data message from the post-trade gateway 150.

Figure 8A:
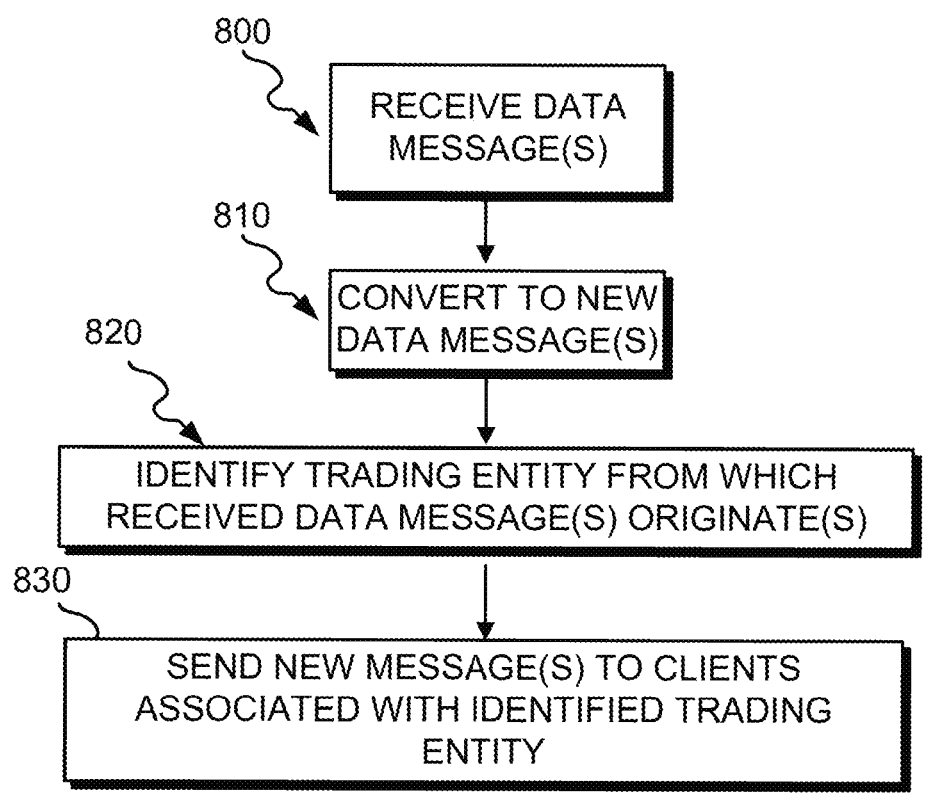
FIG. 8A illustrates a flow-chart illustrating a method according to an embodiment of the invention.

With reference to FIG. 8 and FIG. 6, embodiments of a method will be described. The method may advantageously, but not necessarily, be performed by a gateway 160, such as a so-called "Firm Order Drop" gateway. In a receive step 800, a first data message 601 (e.g., an order data message) is received from a matching engine 140. The first data message 601 has a first data format and, also, comprises identification information (e.g. the information element "Owner") associated with a trading entity. In a data format conversion step 810, the first data message 601 of the first data format into a second data message 602, 604, 605, 607 having a second data format, which different from the first data format. In an identification step 820, the trading entity from which the first data message is originating is identified. This may be done on the basis of the identification information of the received first data message 601, such as from any of the information elements Order Book ID, Order ID or Owner. In a transmission step 830, the second data message 602, 604, 605, 607 is then transmitted, to one or more client devices associated with the identified trading entity.

Figure 8B:
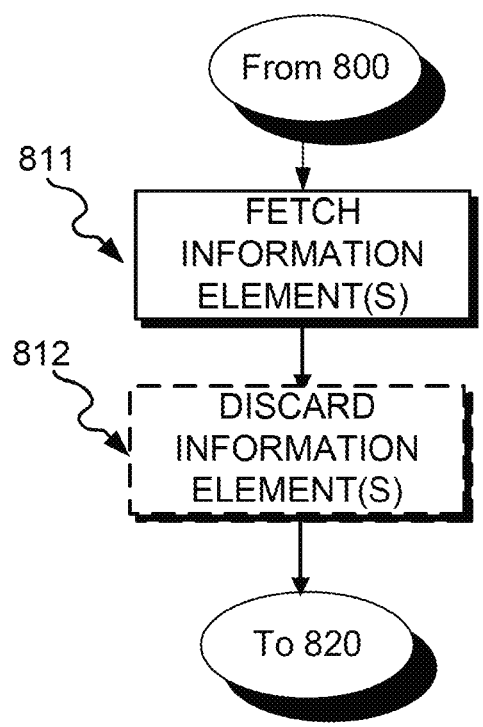
FIG. 8B illustrates a flow-chart illustrating a method according to an embodiment of the invention.

FIG. 8B illustrates an example embodiment on the conversion step 810. The step 810 of converting the first data message of the first data format to a second data message having a second data format may comprise fetching 811 pre-selected information elements from the first data message and creating the second data message based on the fetched information elements. The fetching 811 may comprises fetching at least the first two information elements of the first data message. For example, the fetching 811 may comprise fetching the first five information elements of the first data message. Alternatively, the fetching 811 may comprise fetching information from any of the first five information elements of the first data message.

Moreover, in some embodiments the conversion step 810 additionally comprises converting the first data message of the first data format into an additional, third, data message 603 having a third data format different from the first data format. The conversion step 810 may thus comprise fetching pre-selected information elements from the first data message 601 and creating the second data message 602 based on the fetched information elements, and furthermore fetching pre-selected information elements from the first data message 601 and creating the third data message 603 based on the fetched information elements. The fetching may be according to FIG. 8B. Thus, the fetching 811 may, e.g., comprise fetching information from the first five information elements of the first data message.

In some embodiments, the method also comprises receiving 800 an additional, fourth, data message 606 from the matching engine. The fourth data message 606 has a fourth data format and comprises identification information associated with a trading entity. In the conversion step 810, the fourth data message 606 of the fourth data format can be converted into a fifth data message 608 having a fifth data format, which is different from the fourth data format. Similar as above, the trading entity from which the fourth data message is originating can be identified in an identification step 820. Also, the data message 608 can be transmitted 830 to one or more client devices associated with the identified trading entity. Also similar to the above, the conversion step 810 may comprise fetching information elements 811. For example, pre-selected information elements from the first data message and the fourth data message can be fetched and the fifth data message can be created, or generated, based on the fetched information elements from the first data message and the fourth data message, respectively. In one embodiment, the fetching comprises fetching information from at least one of the information elements of the first data message and fetching information from at least three information elements of the fourth data message.

Turning back to FIG. 8B, it should also be appreciated that the conversion step 810 may optionally comprise a step of discarding one or more information elements. For example, the conversion step may comprise discarding those information elements (e.g. "Extended Order Info. as illustrated in FIG. 6) of the first data message 601 that that are data format specific to the first data format.

Figure 9A:
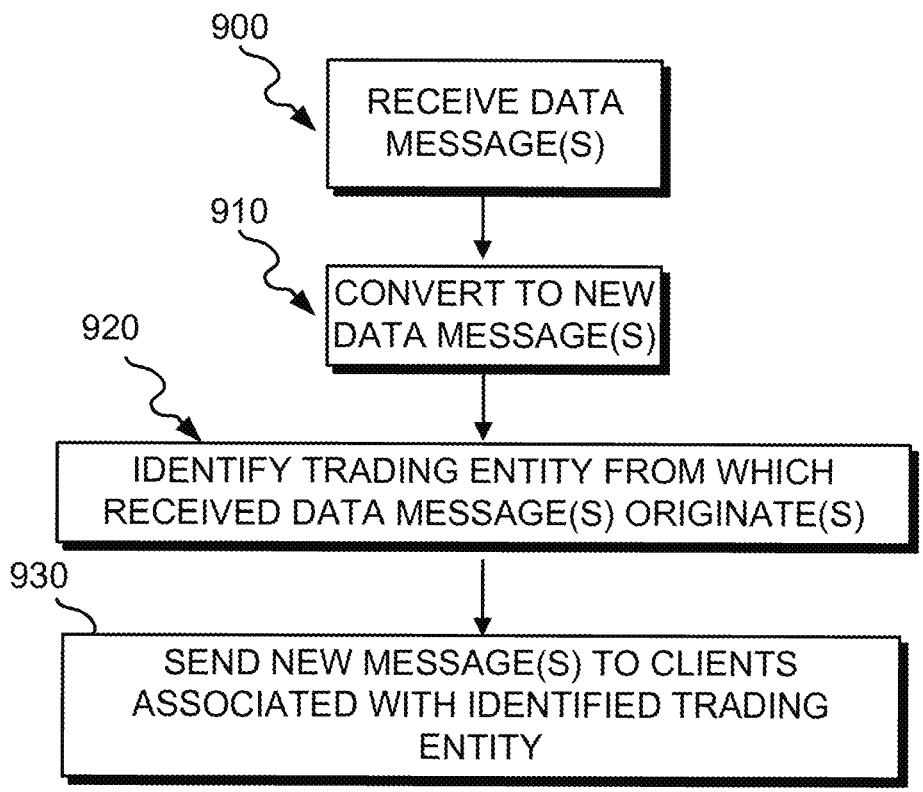
FIG. 9A illustrates a flow-chart illustrating a method according to another embodiment of the invention.

With reference to FIG. 9 and FIG. 7, another example embodiment of a method will be described. The method may advantageously, but not necessarily, be performed by a gateway 170, such as a so-called "Firm Trade Drop" gateway. In a receive step 900, a first data message 701 (e.g., an trade data message) is received from a post-trade gateway 150. The first data message 701 has a first data format and, also, comprises identification information associated (e.g. the information element Trade_base) with a trading entity. In a data format conversion step 910, the first data message 701 of the first data format into a second data message 702 having a second data format, which is different from the first data format. In an identification step 920, the trading entity from which the first data message is originating is identified. This may be done on the basis of the identification information of the received first data message 701, such as from the information element Order Book ID. In a transmission step 930, the second data message 702 is then transmitted, to one or more client devices associated with the identified trading entity.

Figure 9B:
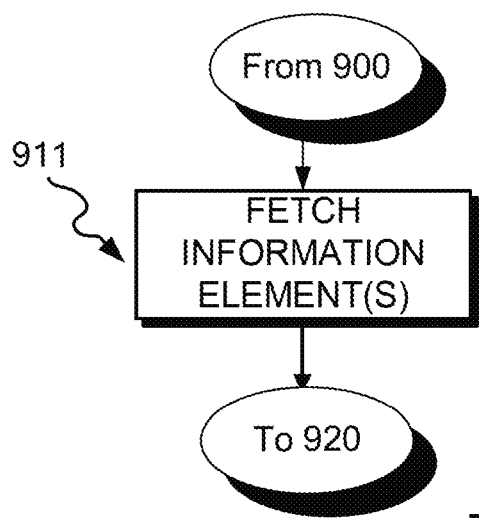
FIG. 9B illustrates a flow-chart illustrating a method according to another embodiment of the invention.

FIG. 9B illustrates an example embodiment on the conversion step 910. In this example, pre-selected information elements are fetched from the first data message 701 (which may be of a so-called BD6 data format) and the second data message 702 is created, or generated, based on the information elements that are fetched from the first trade data message. For example, all information elements of the trade data message 701 can be fetched and put into the new, second, trade data message 702.

Figure 10:
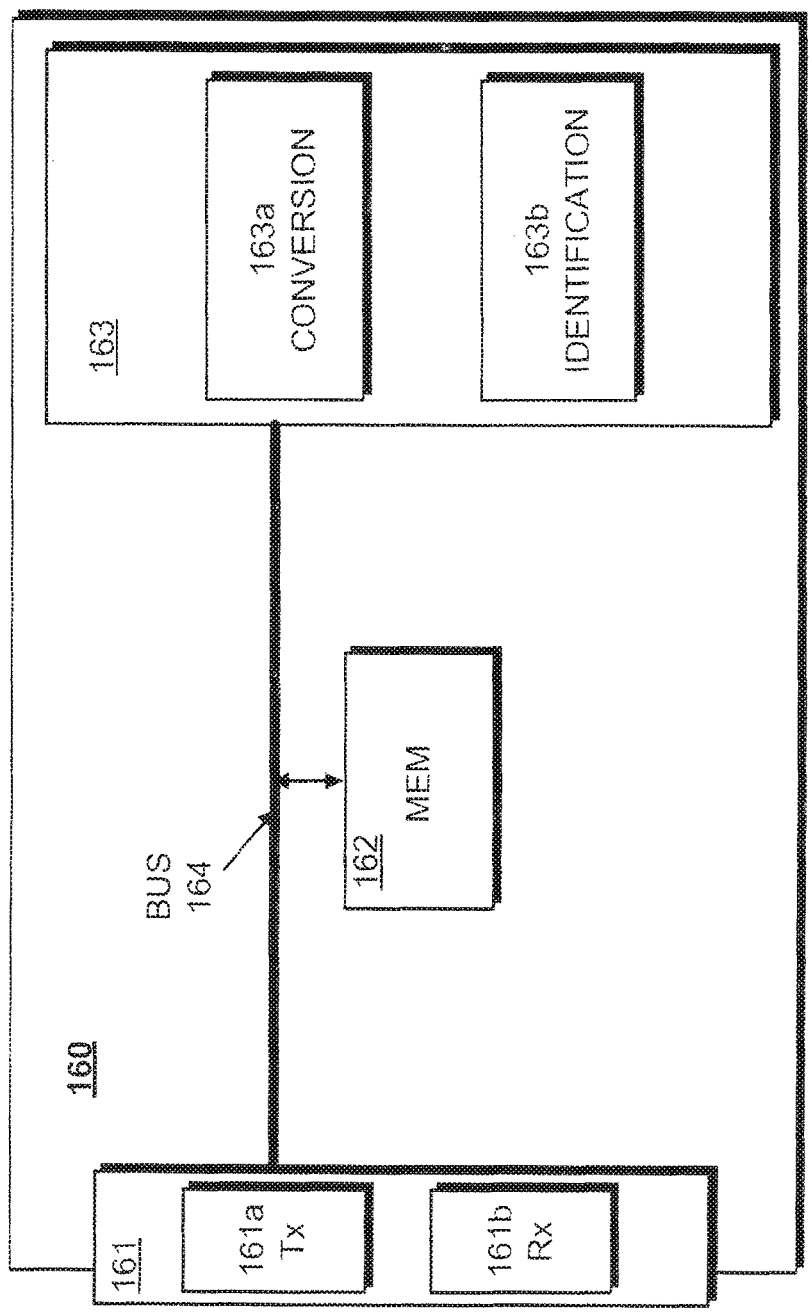
FIG. 10 illustrates a block diagram of an embodiment of a gateway.

FIG. 10 illustrates an example embodiment of the gateway 160, e.g. implemented on a computer. The gateway 160 may, for instance, be configured to perform some or all of the method steps described with respect to the methods described with reference to FIG. 8. Although the example according to FIG. 10 shows an implementation using one single gateway 160, it should be appreciated that the embodiments of the invention can equally possible be implemented by using several units, e.g. several computers, in a distributed manner. That is to say that some or all of the method steps described with respect to the methods described with reference to FIG. 8 can be distributed among two or more physical units, e.g. computers, such that some method steps are performed by one unit and other method steps are performed by one or more other units.

The gateway 160 comprises a communication interface 161 comprising a transmitter 161*a* and a receiver 161*b*. The gateway may comprise a memory 162. The memory 162 may be any combination of random access memory (RAM) and read only memory (ROM). The memory 162 may also comprise persistent storage, which, for example, can be any single one or combination of magnetic memory, optical memory, or solid state memory or even remotely mounted memory. The gateway 160 also comprises a processing circuitry 163, or processing logic circuitry. The communication interface 161, the memory 162 and the processing circuitry 163 may be coupled to a bus 164.

The receiver 161*b* is configured to receive a first data message from a matching engine of the automated exchange 140. The first data message has a first data format and comprises identification information associated with a trading entity. The processing circuitry 163 is configured to convert the first data message of the first data format into a second data message having a second data format different from the first data format. To this end, the processing circuitry 163 may be implemented to include a conversion module 163*a*. Also, the processing circuitry 163 may be configured to identify, on the basis of the identification information of the received first data message, the trading entity from which the first data message is originating. To this end, the processing circuitry may include an identification module 163*b*. The transmitter 161*b* is configured to transmit the second data message to one or more client devices associated with the identified trading entity.

The processing circuitry 163 may be configured to fetch pre-selected information elements from the first data message and create the second data message based on the fetched information elements. For example, the processing circuitry 163 may be configured to fetch at least the first two information elements of the first data message. In some embodiments, the processing circuitry 163 may be configured to fetch the first five information elements of the first data message. The processing circuitry 163 may additionally, or alternatively, be configured to fetch information from any of the first five information elements of the first data message.

Moreover, the processing circuitry 163 may be configured to convert the first data message of the first data format into an additional, third, data message having a third data format different from the first data format. For example, the processing circuitry 163 may be configured to fetch pre-selected information elements from the first data message and create the second data message based on the fetched information elements, and to fetch pre-selected information elements from the first data message and create the third data message based on the fetched information elements.

In yet other embodiments of the gateway 160, the receiver 161b may be further configured to receive, an additional, fourth, data message from the matching engine. The fourth data message may have a fourth data format and comprise identification information associated with a trading entity. The processing circuitry 163 may be further configured to convert the fourth data message of the fourth data format into a fifth data message having a fifth data format different from the fourth data format. Also, the processing circuitry 163 may be configured to identify, on the basis of the identification information of the received fourth data message, the trading entity from which the fourth data message is originating. The transmitter 161a may be further configured to transmit the fifth data message to one or more client devices associated with the identified trading entity. In one embodiment, the processing circuitry 163 may be configured to fetch pre-selected information elements from the first data message and the fourth data message and to create the fifth data message based on the fetched information elements from the first data message and the fourth data message, respectively. For instance, the processing circuitry 163 may be configured to fetch information from at least one of the information elements of the first data message and fetch information from at least three information elements of the fourth data message.

In some implementations of the gateway 160, the processing circuitry 163 may be configured to discard those information elements of the first data message that that are data format specific to the first data format.

Figure 11:
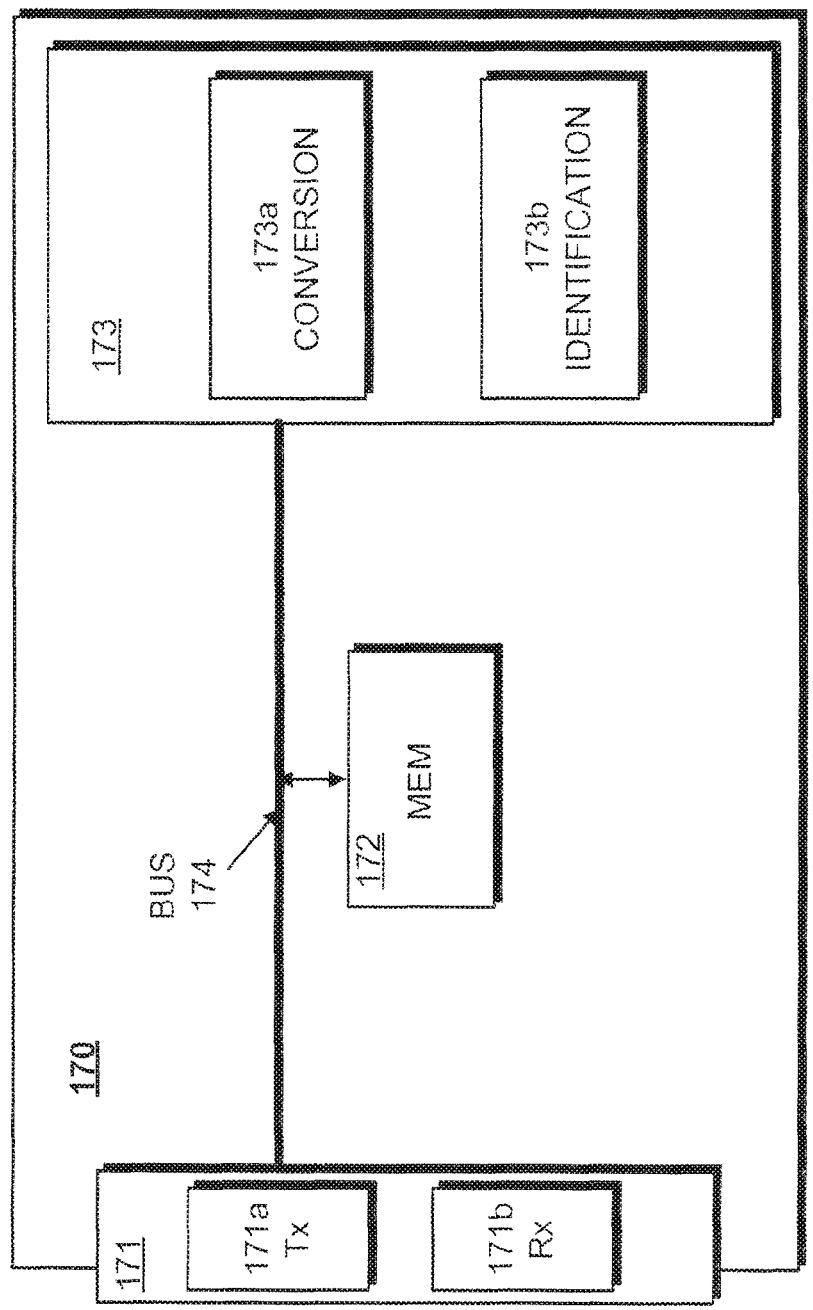
FIG. 11 illustrates a block diagram of an embodiment of another gateway.

FIG. 11 illustrates an example embodiment of the gateway 170, e.g. implemented on a computer. The gateway 170 may, for instance, be configured to perform some or all of the method steps described with respect to the methods described with reference to FIG. 9. Although the example according to FIG. 11 shows an implementation using one single gateway 170, it should be appreciated that the embodiments of the invention can equally possible be implemented by using several units, e.g. several computers, in a distributed manner. That is to say that some or all of the method steps described with respect to the methods described with reference to FIG. 9 can be distributed among two or more physical units, e.g. computers, such that some method steps are performed by one unit and other method steps are performed by one or more other units.

The gateway 170 comprises a communication interface 171 comprising a transmitter 171a and a receiver 171b. The gateway may comprise a memory 172. The memory 172 may be any combination of random access memory (RAM) and read only memory (ROM). The memory 172 may also comprise persistent storage, which, for example, can be any single one or combination of magnetic memory, optical memory, or solid state memory or even remotely mounted memory. The gateway 170 also comprises a processing circuitry 173, or processing logic circuitry. The communication interface 171, the memory 172 and the processing circuitry 173 may be coupled to a bus 174.

The receiver 171b is configured to receive a first data message from a post-trade gateway 150. The first data message, which is a post-trade data message, has a first data format and also comprises identification information associated with a trading entity. The processing circuitry 173 is configured to convert the first data message of the first data format (e.g. a BD6 data format) into a second data message having a second data format, which is different from the first data format. To this end, the processing circuitry 173 may be implemented to include a conversion module 173a. Also, the processing circuitry 173 may be configured to identify, on the basis of the identification information of the received first data message, the trading entity from which the first data message is originating. To this end, the processing circuitry may include an identification module 173b. The transmitter 171b is configured to transmit the second data message to one or more client devices associated with the identified trading entity. The processing circuitry 173 may be configured to fetch pre-selected information elements from the first data message and create the second data message based on the fetched information elements. For example, the processing circuitry 173 may be configured to fetch at least the first five information elements of the first data message as was described hereinabove with reference to FIG. 7.

Although the present invention has been described above with reference to specific embodiments, it is not intended to be limited to the specific form set forth herein. Rather, the invention is limited only by the accompanying claims and, other embodiments that the specific above are equally possible within the scope of the appended claims. All changes which come within the meaning and range of equivalency of the claims are to be embraced within their scope. Also, when used herein the terms "comprise/comprises" and "include/includes" does not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A gateway configured to process data, comprising:
a receiver configured to receive a first trading data message having a first data format compatible with a first protocol in which a first set of client devices associated with an entity communicate; and
processing circuitry configured to:
receive the first trading data message from an automated electronic exchange system;
retrieve a first set of pre-selected trading information elements from the first trading data message;
modify the first set of pre-selected trading information elements by discarding at least one information element from the first trading data message specific to the first data format, and retaining one or more information elements from the first set of pre-selected trading information elements;
convert the first trading data message to a second trading data message using the modified first set of pre-selected trading information elements, the second trading data message having a second data format different from the first data format and compatible with a second protocol in which a second set of client devices associated with the entity communicate; and
transmit the second trading data message to at least the second set of client devices associated with the entity, wherein the first set of client devices and the second set of client devices are configured to:
obtain the first trading data message or the second trading data message; and
obtain an overview of total order or trading activity for the entity using at least the first trading data message or the second trading data message,
wherein the processing circuitry of the gateway is further configured to:
retrieve a second set of pre-selected trading information elements, different from the first set of pre-selected trading information elements, from the first trading data message; and
create a third trading data message using the retrieved second set of pre-selected trading information elements but not using the at least one discarded information element from the first trading data message, the third trading data message having a third data format different from the first data format.

2. The gateway of claim 1, wherein the first trading data message includes identification information associated with the entity enabled to conduct exchange on the automated electronic exchange system.

3. The gateway of claim 2, wherein the processing circuitry is further configured to identify, on the basis of the identification information of the received first trading data message, the entity from which the first trading data message is originating.

4. The gateway of claim 1, wherein the second set of pre-selected trading information elements are different from the first set pre-selected trading information elements but include an indicator of a name of an item affected by the first trading data message.

5. The gateway of claim 1, wherein the processing circuitry is further configured to:
receive an additional fourth trading data message having a fourth data format and comprising identification information associated with the entity;
convert the fourth trading data message of the fourth data format into a fifth trading data message having a fifth data format different from the fourth data format;
identify, on the basis of the identification information of the received fourth trading data message, the entity from which the fourth trading data message is originating; and
transmit the fifth trading data message to client devices associated with the identified entity.

6. The gateway of claim 5, wherein the converting of the fourth trading data message comprises retrieving pre-selected trading information elements from the first trading data message and the fourth trading data message and creating the fifth trading data message based on the retrieved information elements from the first trading data message and the fourth trading data message, respectively.

7. The gateway of claim 6, wherein the retrieving comprises retrieving information from at least one of the information elements of the first trading data message and retrieving information from at least three information elements of the fourth trading data message.

8. The gateway of claim 1, wherein the first data format is BD6.

9. The gateway of claim 1, wherein the first protocol associated with the first data format is OMNet and the second protocol associated with the second data format is OUCH.

10. The gateway of claim 1, wherein the gateway is configured to provide signaling such that all client devices associated with the entity obtain an aggregated view of total order or transaction activity of the entity.

11. The gateway of claim 1, wherein the at least one discarded information element includes extended trading order information.

12. A method of processing data, comprising:
at a gateway node having a processing system that includes processing circuitry, a memory, and a communication interface:
receiving a first data message having a first data format compatible with a first protocol in which a first set of client devices associated with an entity communicate;
retrieving a first set of pre-selected information elements from the first data message;
modifying the first set of pre-selected information elements by discarding at least one information element from the first data message specific to the first data format, and retaining one or more information elements from the first set of pre-selected information elements;
converting the first data message to a second data message using the modified first set of pre-selected information elements, the second data message having a second data format different from the first data format and compatible with a second protocol in which the second set of client devices associated with the entity communicate;
using at least the first set of client devices and the second set of client device associated with the entity;
obtaining the first trading data message or the second trading data message; and
obtaining an overview of total order or trading activity for the entity; and
transmitting the second trading data message to at least the second set of client devices associated with the entity, wherein
the processing circuitry is further configured to:
retrieve a second set of pre-selected information elements from the first data message; and
create a third data message using the retrieved second set of pre-selected information elements but not using the at least one discarded information element from the first data message, the third data message having a third data format different from the first data format.

13. The method of claim 12, wherein the first data message includes identification information associated with the entity enabled to conduct exchange on an automated electronic exchange system and the processing circuitry is further configured to identify, on the basis of the identification information of the first data message, the entity from which the first data message is originating.

14. The method of claim 12, wherein the gateway node is configured to provide signaling such that all client devices associated with the entity obtain an aggregated view of total order or transaction activity of the entity.

15. The method of claim 12, wherein the first protocol associated with the first data format is OMNet and the second protocol associated with the second data format is OUCH.

16. The method of claim 12, further comprising:
receiving an additional fourth trading data message having a fourth data format and comprising identification information associated with the entity;

converting the fourth trading data message of the fourth data format into a fifth trading data message having a fifth data format different from the fourth data format;

identifying, on the basis of the identification information of the received fourth trading data message, the entity from which the fourth trading data message is originating; and transmitting the fifth trading data message to client devices associated with the identified entity.

17. A system, comprising:

processing circuitry; and a memory configured to store computer readable instructions that, when executed by the processing circuitry, cause the system to:

receive a first data message having a first data format compatible with a first protocol in which a first set of client devices associated with an entity communicate;

retrieve a first set of pre-selected information elements from the first data message;

modify the first set of pre-selected information elements by discarding at least one information element from the first data message specific to the first data format, and retaining one or more information elements from the first set of pre-selected information elements;

convert the first data message to a second data message using the modified first set of pre-selected information elements, the second data message having a second data format different from the first data format and compatible with a second protocol in which the second set of client devices associated with the entity communicate; and transmit the second data message to at least the second set of client devices associated with the entity, wherein the first set of client devices and the second set of client devices are configured to:

obtain the first trading data message or the second trading data message; and obtain an overview of total order or trading activity for the entity, wherein the system is further configured to:

retrieve a second set of pre-selected information elements; and create a third data message using the second set of pre-selected information elements.

18. The system of claim 17, wherein the system is further configured to:

create the third data message using the second set of pre-selected information elements but not using the at least one discarded information element from the first data message, the third data message having a third data format different from the first data format.

19. The system of claim 18, wherein the first data message including identification information associated with the entity enabled to conduct exchange on an automated electronic exchange system and the processing circuitry is further configured to identify, on the basis of the identification information of the received first data message, the entity from which the first data message is originating.

20. The system of claim 17, wherein the system is further configured to:

receive an additional fourth trading data message having a fourth data format and comprising identification information associated with the entity;

convert the fourth trading data message of the fourth data format into a fifth trading data message having a fifth data format different from the fourth data format;

identify, on the basis of the identification information of the received fourth trading data message, the entity from which the fourth trading data message is originating; and transmit the fifth trading data message to client devices associated with the identified entity.

* * * * *